United States Patent [19]

Suzuki et al.

[11] Patent Number: 5,493,698
[45] Date of Patent: Feb. 20, 1996

[54] RADIO APPARATUS FOR SIMULATANEOUSLY TRANSMITTING AND RECEIVING SIGNALS USING A SIMPLE FREQUENCY

[75] Inventors: Osamu Suzuki; Kazuo Suzuka, both of Sayama; Mitsuo Shiraishi, Musashino; Sakari Ohira, Sendai; Fujio Sumi, Tokyo; Kenichi Suzuki, Yokohama, all of Japan

[73] Assignees: Hitachi Denshi Kabushiki Kaisha, Tokyo; Tohoku Electric Power Co., Inc., Miyagi; Fuji-Tekku Kabushiki Kaisha, Tokyo, all of Japan

[21] Appl. No.: 202,217

[22] Filed: Feb. 25, 1994

[30] Foreign Application Priority Data

Feb. 26, 1993 [JP] Japan .................................. 5-061352

[51] Int. Cl.⁶ .............................. H04B 1/00; H04B 1/40
[52] U.S. Cl. ............................ 455/72; 455/51.1; 455/84; 455/226.1
[58] Field of Search ................................ 455/67.1, 51.1, 455/72, 73, 78, 82, 84, 86, 226.1; 370/118, 29; 381/106

[56] References Cited

U.S. PATENT DOCUMENTS

| | | | |
|---|---|---|---|
| 3,150,374 | 9/1964 | Sustein et al. | 455/51.1 |
| 4,644,524 | 2/1987 | Emery | 370/29 |
| 4,882,762 | 11/1989 | Waldhauer | 381/106 |
| 5,121,408 | 6/1992 | Cai at al. | 375/1 |
| 5,355,363 | 10/1994 | Takahachi et al. | 370/29 |

FOREIGN PATENT DOCUMENTS 0271094 6/1988 European Pat. Off. ................. 455/72

OTHER PUBLICATIONS

Simultaneous transmitting and receiving method mobile radio using only one frequency channel IEICE, Spring Conference, Paper No. B-769, pp. 3-336 Mar. 15, 1992.

Primary Examiner—Edward F. Urban
Assistant Examiner—Lee Nguyen
Attorney, Agent, or Firm—Antonelli, Terry, Stout & Kraus

[57] ABSTRACT

A radio apparatus having a unit for receiving a first signal from a first transceiver compressed in time by a predetermined rate, a unit for reproducing a first original signal from the first signal, a unit for receiving a second signal from a second transceiver compressed by the predetermined rate during the reception period of the first transceiver, a unit for reproducing a second original signal from the second signal, and a unit for adding the first and second original signals and outputting the added signal.

7 Claims, 8 Drawing Sheets

FIG. 1

FIG. 2(a) DEMODULATED SIGNAL 23

| S | A1 | B1 | S2 | A2 | B2 | S3 | A3 | B3 | S4 | A4 | B4 | S5 |

FIG. 2(b) SYNCHRONIZING SIGNAL 24

FIG. 2(c) TRANSMISSION / RECEPTION SWITCHING SIGNAL 25

FIG. 2(d) OUTPUT 26 FROM D/A 6

| A1 | A2 | A3 | A4 |

FIG. 2(e) OUTPUT 43 FROM D/A 41

| B1 | B2 | B3 | B4 |

FIG. 3(a) DEMODULATED SIGNAL 23

FIG. 3(b) SYNCHRONIZING SIGNAL 24

FIG. 3(c) TRANSMISSION / RECEPTION SWITCHING SIGNAL 25

FIG. 3(d) OUTPUT 26 FROM D/A 6

FIG. 3(e) INPUT 27 AT MICROPHONE

FIG. 3(f) OUTPUT 28 FROM D/A 4

FIG. 6(a) INCOMING CALL SWITCH 30

FIG. 6(b) DEMODULATED SIGNAL 23

FIG. 6(c) SYNCHRONIZING SIGNAL 24

FIG. 6(d) TRANSMISSION/RECEPTION SWITCHING SIGNAL 25

FIG. 6(e) OUTPUT 26 FROM D/A 6

FIG. 6(f) VOICE SIGNAL 27

FIG. 6(g) OUTPUT 28 FROM D/A 4

RADIO APPARATUS FOR SIMULATANEOUSLY TRANSMITTING AND RECEIVING SIGNALS USING A SIMPLE FREQUENCY

BACKGROUND OF THE INVENTION

The present invention relates to a radio, apparatus used in radio communication systems in which both talking and listening, or transmission and reception, of speech signals are simultaneously performed by using a single frequency.

The definitions of terms used in this specification will be given prior to the description of the invention. A "radio apparatus," as used in this specification, means either an apparatus with an integrated function of both a transmitter and a receiver or an apparatus with a single function of a receiver. A "transceiver" used in this specification means an apparatus with an integrated function of both a transmitter and a receiver, unless it is defined differently in some part of this specification.

Two frequencies for the two directions are generally required for duplex radio communication of transmission and reception. Needless to say, it is preferable that duplex communication is realized by using one frequency for the efficient use of frequency bands In some fields of applications, the high quality of sounds is not necessarily important. In such cases, the following conventional method has been used for duplex radio communication with a single frequency.

A synchronizing signal generator at an originating call station generates a synchronizing signal for informing another station of switch timing between transmission and reception. A synchronizing signal detector at the incoming call station detects the synchronizing signal contained in a received signal.

The incoming call station has a transmission/reception switching unit for switching between transmission and reception in response to a timing signal generated by the incoming call station itself or the received synchronizing signal, thereby alternately performing synchronous transmission and reception. Specifically, at the originating call station, a voice signal to be transmitted is A/D converted at a predetermined time interval and stored in a memory. The stored data is read at one half the predetermined time interval, D/A converted, and supplied to a modulator during a transmission period to thus transmit the voice signal compressed in one half the actual time period. On the other hand, at the incoming call station, the received voice signal compressed in one half the actual time period is A/D converted at a predetermined time interval and stored in a memory. The stored data is read at twice the predetermined time interval, and D/A converted to obtain a voice signal expanded to the original voice signal. In this way, simultaneous transmission and reception are performed using a single frequency.

When two transceivers are operating in such a simultaneous transmission and reception with a single frequency, a third party station can monitor only voice signals transmitted from only one transceiver which is generating a synchronizing signals in addition to the voice signals, and cannot monitor voice signals transmitted from the other transceiver which operates to receive synchronizing signals. The third party station cannot grasp therefore the full communication between the two transceivers.

One example of the simultaneous transmission and reception communication system is shown in the paper titled "Simultaneous Transmitting and Receiving Method Mobile Radio Using Only One Frequency Channel", Proceedings of the 1992 IEICE (Institute of Electronics, Information & Communication Engineers) Spring Conference, Paper No. B-769, page 3–336, Mar. 15, 1992.

SUMMARY OF THE INVENTION

It is a first object of the present invention to provide a radio apparatus capable of monitoring the full communication between two transceivers in the simultaneous transmission and reception with a single frequency.

It is a second object of the present invention to provide a radio apparatus capable of switching between the simultaneous transmission and reception communication mode and a monitoring mode.

It is a third object of the present invention to provide a radio apparatus capable of monitoring the contents of communication of either one of two transceivers simultaneous transmission and reception with a single frequency.

According to an embodiment of the present invention, a radio apparatus has a controller which selects either the simultaneous transmission and reception operation or a monitoring operation. In monitoring the contents of communication between the first and second transceivers, the radio apparatus receives voice signals from the first and second transceivers, the first voice signals from the first transceiver are expanded and output from a first D/A converter, and the second voice signals from the second transceiver are expanded and output from a second D/A converter. The two voice signals are added together and reproduced by a loudspeaker of the radio apparatus.

When the controller selects the monitoring operation, this radio apparatus can monitor the voices from both the first and second transceivers operating in simultaneous transmission and reception wherein the originating call transceiver is transmitting synchronizing signals and the incoming call transceiver detecting them.

BRIEF DESCRIPTION OF THE DRAWINGS

FIG. 2 is a timing chart showing timing of waveforms at various circuit portions, explaining the operation of the radio apparatus of the embodiment;

DESCRIPTION OF THE PREFERRED EMBODIMENTS

Figure 5:
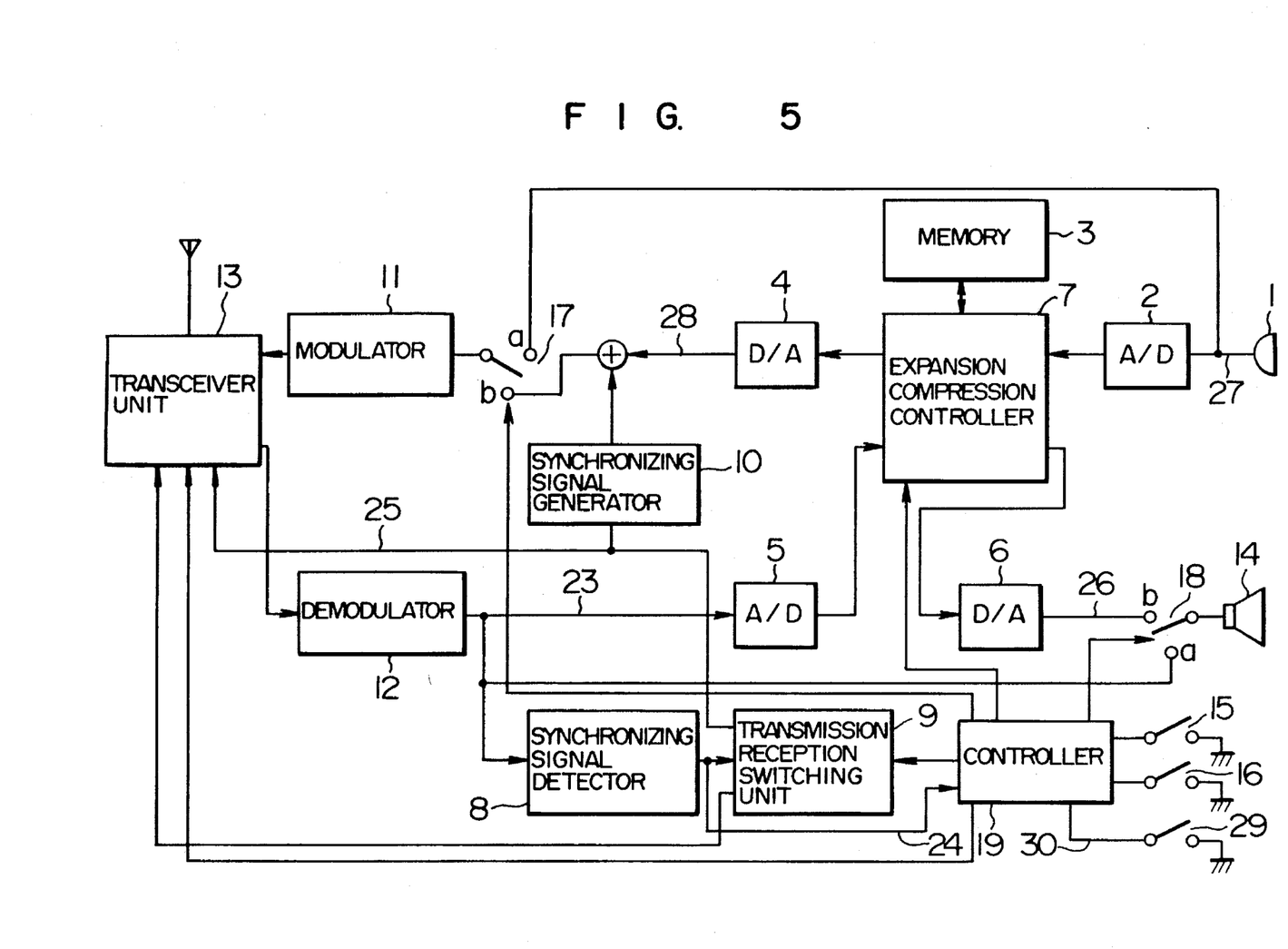
FIG. 5 is a circuit block diagram of a radio apparatus capable of selecting either a simplex voice communication operation or a simultaneous transmission and reception operation with a single frequency.
Figure 6A:
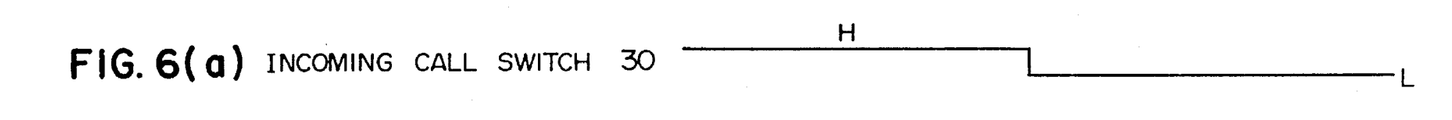
FIG. 6 is a timing chart showing timings of waveforms at various circuit portions, explaining the operation of the radio apparatus shown in FIG. 5.
Figure 6B:
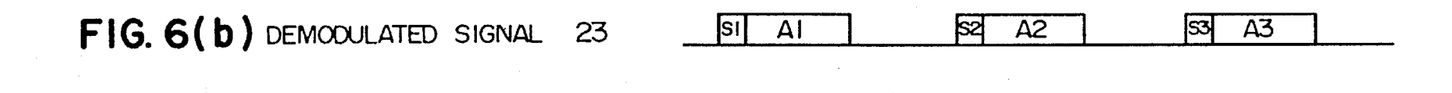
Figure 6C:
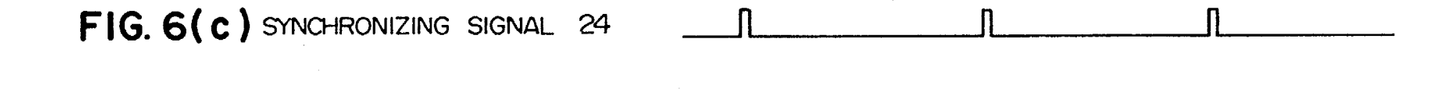
Figure 6D:
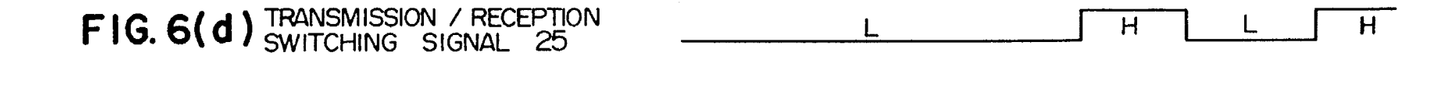
Figure 6E:
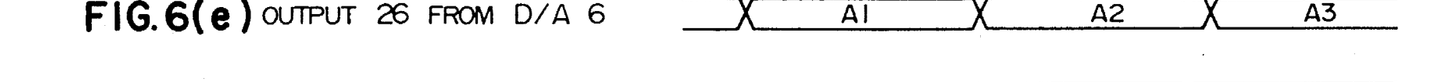
Figure 6F:
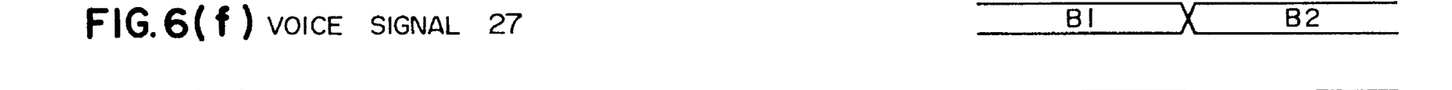
Figure 6G:
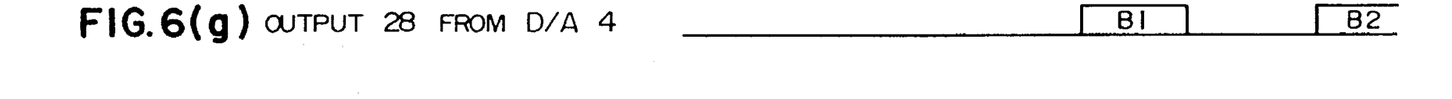

Prior to the description of the embodiments of the present invention, an example of a radio communication system capable of selecting either a simplex voice communication operation or a simultaneous transmission and reception with a single frequency, will be described with reference to FIGS. 5 and 6. FIG. 5 is a circuit block diagram of a radio apparatus incorporating both a press-to-talk method and a method of the simultaneous transmission and reception with a single frequency. The circuit shown in FIG. 5 is disclosed in the specification of Japanese Patent Application No. 4-269132 (still not laid open) filed on Sept. 14, 1992 and assigned to the same assignee of the present invention.

Referring to FIG. 5, reference numeral 1 represents a voice input unit such as a microphone for inputting voices to be transmitted, reference numeral 2 represents an A/D converter for converting a voice signal to be transmitted into digital data, reference numeral 3 represents a memory for storing digital data, and reference numeral 4 represents a D/A converter for converting digital data read from the memory 3 into analog signals. Reference numeral 7 represents a compression/expansion controller for controlling reading of digital data output from the A/D converter 2 and stored in the memory 3 and to supply the read digital data to the D/A converter 4. For example, the controller 7 controls reading of digital data as data compressed in time by ½.

Reference numeral 5 represents an A/D converter for converting a received voice signal into digital data, reference numeral 6 represents a D/A converter for converting digital data read from the memory 3 into analog signals. The compression/expansion controller 7 controls reading of compressed data written in the memory 3 and supplying of the read data to the D/A converter 6 For example, the controller 7 controls reading of digital data as data expanded two-fold, to thereby reproduce original voices.

Reference numeral 8 represents a synchronizing signal detector for detecting a predetermined synchronizing signal contained in a received voice signal, reference numeral 9 represents a transmission/reception switching unit for switching the operation of the radio apparatus to either a transmission mode or a reception mode, reference numeral 10 represents a synchronizing signal generator for generating a synchronizing signal in response to transmission/reception switching and for supplying the synchronizing signal to a modulator 11 which modulates a voice signal to be transmitted, reference numeral 12 represents a demodulator for demodulating a received voice signal, reference numeral 13 represents a transceiver unit, and reference numeral 14 represents a voice output unit such as a loudspeaker from which voices for a received signal are output.

Reference numeral 15 represents a press-to-talk switch used for switching between reception and transmission when the communication apparatus is used as a press-to-talk transceiver. Reference numeral 16 represents a calling switch for starting the simultaneous transmission and reception with a single frequency in synchronism with a synchronizing signal generated by its own radio apparatus. Reference numeral 17 represents a switch for selecting either an ordinary voice signal used for a press-to-talk radio apparatus or a compressed voice signal used for a radio apparatus in the simultaneous transmission and reception with a single frequency. Reference numeral 18 represents a switch for selecting as an input to the loudspeaker 14 either an ordinary voice signal or an expanded voice signal. Reference numeral 19 represents a controller made of a microcomputer and the like. This controller 19 controls the apparatus either as a press-to-talk radio apparatus or a radio apparatus in the simultaneous transmission and reception with a single frequency, depending upon the depression of the switches 15 and 16, and controls the switches 17 and 18, compression/expansion controller 7, transmission/reception unit 9, transceiver unit 13, and other circuits. Reference numeral 29 represents an incoming call switch for starting the simultaneous transmission and reception synchronously with a detected synchronizing signal. If this switch 29 is not being depressed when the synchronizing signal is detected, the radio apparatus continues a reception state. In this case, although the received compressed voice signal is expanded and output, a compressed voice signal is not transmitted. When this switch 29 is depressed, duplex voice communication starts.

The operation of the radio apparatus shown in FIG. 5 will be described. The operation under the conditions wherein no synchronizing signal is being detected and neither the calling switch 16 nor the incoming call switch 29 is depressed, is the same as that of an ordinary simplex radio apparatus, i.e., a press-to-talk transceiver. In this operation, the controller 19 turns the switch 18 to contact a so that an output of the demodulator 12 is directly supplied to the loudspeaker 14. When the contact of the press-to-talk switch 15 is closed, the controller 19 makes the transceiver unit 13 enter a transmission state, and turns the switch 17 to contact a so that voices entered from the microphone 1 are input directly to the modulator 11 and transmitted via the transceiver unit 13.

The timing chart of Fig.6 explains the operation when a synchronizing signal is detected (hereinafter this operation is called an incoming call mode). In FIGS. 5 and 6, reference numeral 23 represents an output from the demodulator 12, reference numeral 24 represents a synchronizing signal detection signal output from the synchronizing signal detector 8, reference numeral 25 represents a transmission/reception switching signal output from the transmission/reception switching unit 9, reference numeral 26 represents an output from the D/A converter 6, reference numeral 27 represents a voice signal output from the microphone 1, and reference numeral 28 represents an output from the D/A converter 4. Reference numeral 30 represents a signal indicating the status of the incoming call switch 29, this signal 30 taking a low (L) level while it is depressed. The controller 19 controls to turn the switch 18 to contact b so that demodulated outputs 23 labeled by A1, A2, and A3 compressed in time by ½ and transmitted from the originating call station are passed through a circuitry of A/D converter 5, memory 3, and D/A converter 6 to expand them to original voices under the control of the compression/expansion controller 7, the expanded voices being output from the loudspeaker 14. The level of the transmission/reception switching signal 25 takes the L level until the called switch 29 is depressed, maintaining the transceiver unit 13 in a reception state.

When the incoming call switch 29 is depressed, the controller 19 controls the transmission/reception switching unit 9 to make it deliver the transmission/reception signal synchronously with the synchronizing signal detection signal. The transmission/reception switching unit 9 makes the transceiver unit 13 alternately switch between the transmission and reception states. The "High" and "Low" level periods of the transmission/reception switching signal 25 indicated at (d) in FIG. 6 correspond to the transmission and reception periods, respectively.

The controller 19 controls to turn the switch 17 to contact b so that a sound signal indicated at (f) in FIG. 6 is passed through a circuitry of the A/D converter 2, memory 3, and D/A converter 4 to compress it by 1/2 under the control of the compression/expansion controller 7, the compressed voice signals labeled by B1 and B2 indicated at (g) in FIG. 6 being supplied to the modulator 11 and transmitted from the transceiver unit 13 during the transmission periods.

Figure 7:
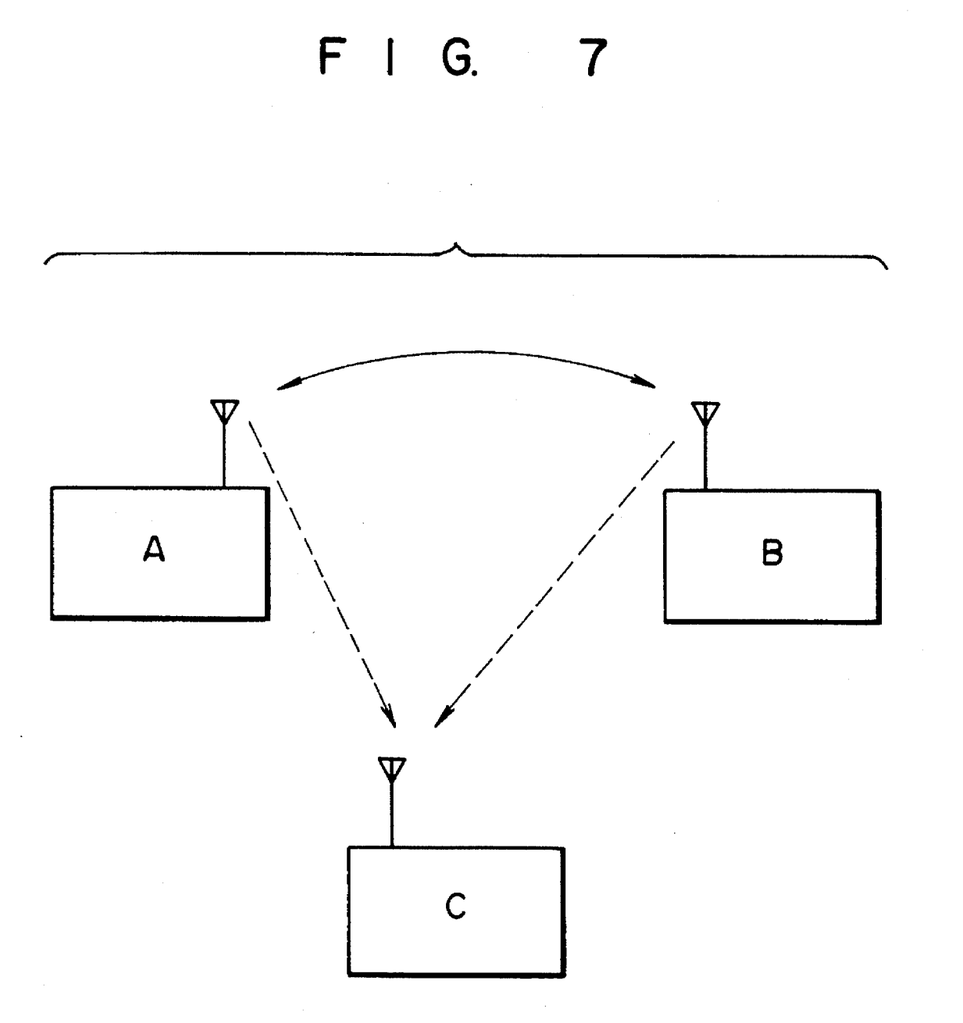
FIG. 7 is a schematic diagram showing a communication system which can use the radio apparatus of the present invention.

The embodiments of the radio apparatus of the present invention will be described with reference to FIG. 1. Prior to giving the description of the radio apparatus shown in FIG. 1, an example of using the radio apparatus shown in FIG. 1 will be explained with reference to FIG. 7. The radio apparatus shown in FIG. 1 corresponds to transceiver C shown in FIG. 7 in which transceiver A as an originating call station and transceiver B as an incoming call station are communicating in the simultaneous transmission and reception with a single frequency. Transceiver C monitors the communication between transceivers A and B. It is obvious that the functions of the transceiver C may be provided to the transceivers A and B.

Figure 1:
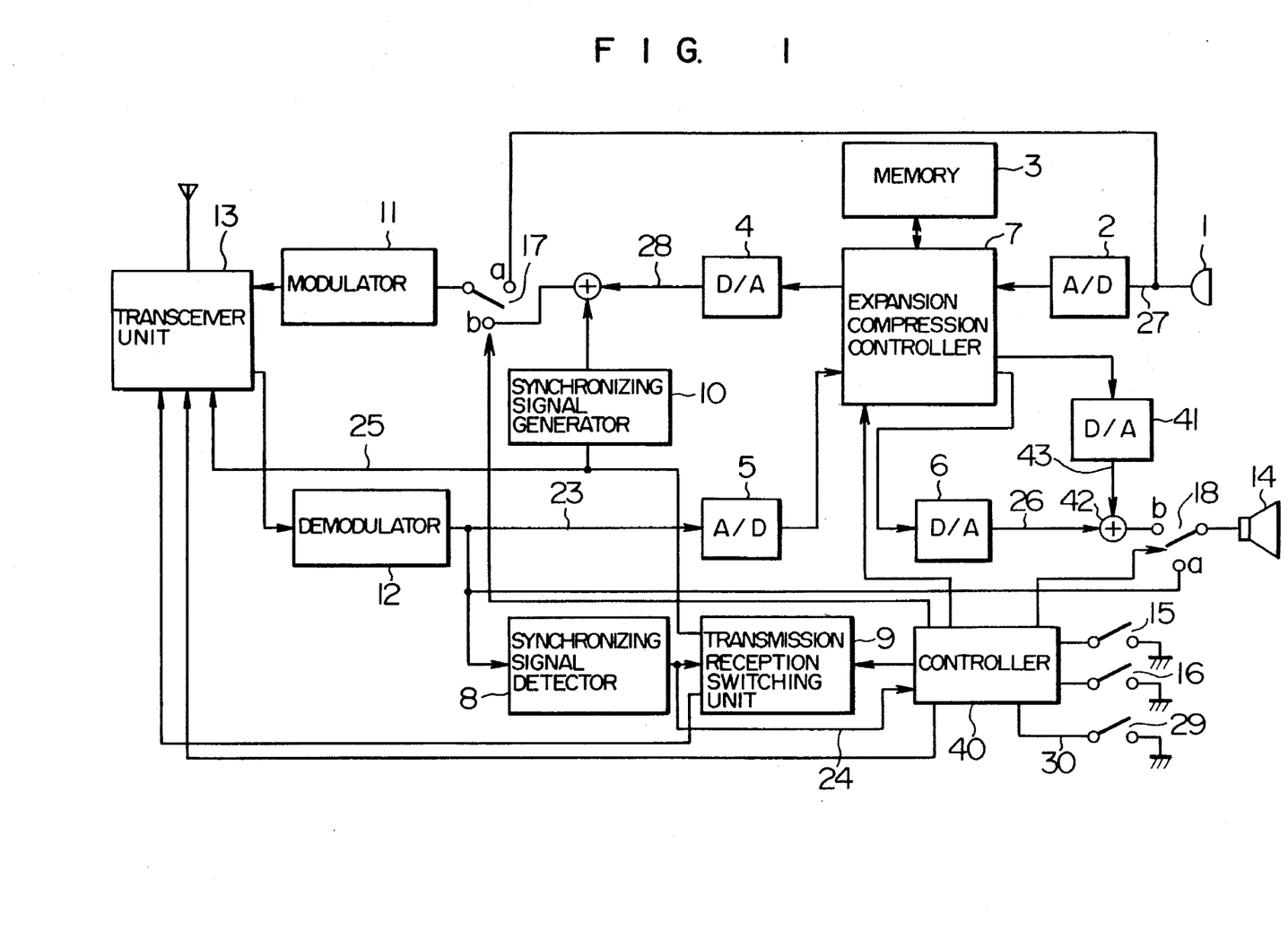
FIG. 1 is a circuit block diagram of a radio apparatus according to an embodiment of the present invention.
Figure 3A:
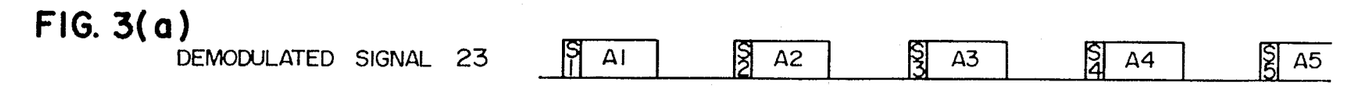
FIG. 3 is a timing chart showing timing of waveforms at circuit portions, explaining the operation of the radio apparatus of the embodiment.
Figure 3B:
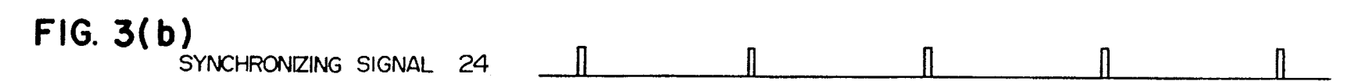
Figure 3C:
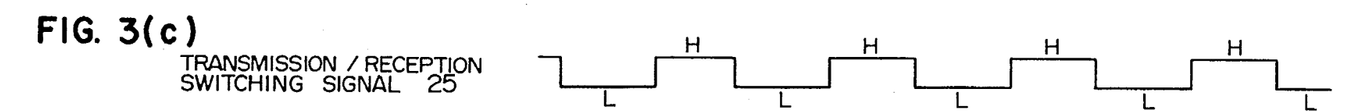
Figure 3D:
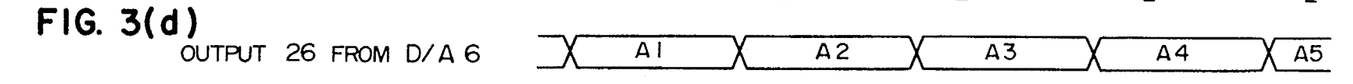
Figure 3E:
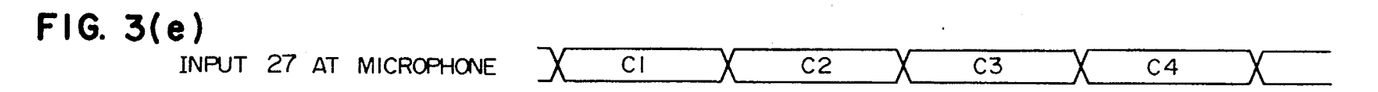
Figure 3F:
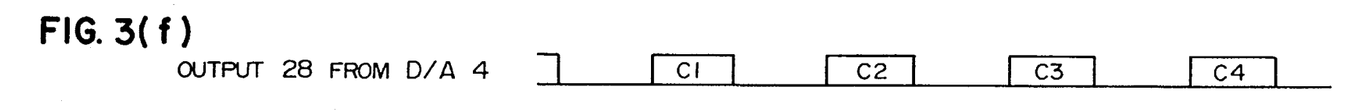

Referring to FIG. 1, like elements to those explained with FIG. 5 are represented by using identical reference numerals, and the description thereof is omitted. Reference numeral 40 represents a controller for controlling the overall operation of the radio. The controller 40 has a monitoring function specific to the present invention, as well as the functions of the controller 19 shown in FIG. 5, i.e., the function of operating the transceiver either as a press-to-talk simplex voice communication transceiver or as a transceiver of simultaneous transmission and reception. Reference numeral 41 represents a D/A converter which converts digital data from the A/D converter 5 stored in the memory 3 and expanded by the compression/expansion controller 7 into original analog voice signals. Reference numeral 42 represents an adder for adding together a voice signal from the D/A converter 6 and a voice signal from the D/A converter 41.

The operation of monitoring the contents of communication between the transceivers A and B by the radio apparatus of FIG. 1 corresponding to the transceiver C will be described with reference to the timing chart shown in FIG. 2. Consider now the case wherein the switches 15, 16, and 29 are not depressed and the transmission/reception switching signal 25 indicated at (c) in FIG. 2 of the transmission/reception switching unit 9 takes the L level and the transceiver unit 13 is set to a reception mode.

During the simultaneous transmission and reception communication with a single frequency between the transceivers A and B, compressed signals from the transceivers A and B are input via an antenna of the transceiver unit 13 of the transceiver C shown in FIG. 1, and demodulated by the demodulator 12 so as to obtain demodulated signals 23 indicated at (a) in FIG. 2.

A1, A2, . . . , A4 represent compressed signals transmitted from the transceiver A, e.g., signals compressed in time by ½, B1, B2, . . . , B4 represent compressed signals transmitted from the transceiver B, e.g., signals compressed in time by ½, and S1, S2, . . . , S4 represent synchronizing signals. The synchronizing signal detector 8 receives these compressed signals and generates synchronizing signal detection signals 24 indicated at (b) in FIG. 2 which are then supplied to the controller 40. In order to prevent malfunction of the synchronizing signal detector 8, the controller 40 may be adapted to operate upon reception of, for example, two or more synchronizing signal detection signals 24. When a synchronizing signal detection signal 24 is input to the controller 40, the controller 40 turns the switch 18 to the contact b and controls the compression/expansion controller 7 in the following manner. The controller 40 and compression/expansion controller 7 may be realized by using well known circuit components such as microcomputers.

Under the control by the controller 40, the demodulated signal 23 indicated at (a) in FIG. 2 is stored in the memory 3 via the A/D converter 5 and compression/expansion controller 7. Next, the demodulated signal 23 is read from the memory 3 under the control of the controller 40 while expanding it, for example, substantially doubling the signal. This expanded signal from the transceiver A is supplied to the D/A converter 6 which supplies a signal indicated at (d) in FIG. 2 such as a voice signal (which may be a data signal other than voice signal such as medical data signal from a cardiogram) to the adder 42. On the other hand, the signal from the transceiver B is supplied to the D/A converter 41 which supplies a signal indicated at (e) in FIG. 2 to the adder 42. An output of the adder 42 is supplied to the loudspeaker 14 to reproduce audible sounds such as voices of the signals transmitted from the transceivers A and B.

During the above operation, the transceiver C does not transmit signals and the switch 17 is maintained open.

When the detection of the synchronizing signal detection signal 24 is stopped, the controller 40 turns the switch 18 to the contact a so that an output of the demodulator 12 is directly supplied to the loudspeaker 14. The controller 40 also turns the switch 17 to the contact a to allow a voice signal from the microphone to be directly supplied to the modulator 11. Switching between transmission and reception is effected by the press-to-talk switch 15. In this manner, the operation returns to the simplex communication mode.

The operation in which the switch 29 is depressed while the synchronizing signal 24 is detected, will be described with reference to FIG. 3. This operation is the same as a conventional incoming call mode. Specifically, under the control by the controller 40, the transmission/reception switching unit 9 sends the transmission/reception switching signal 25 indicated at (c) in FIG. 3 to the transceiver unit 13 to control it. The H level corresponds to the transmission period, and the L level corresponds to the reception period. Reference numeral 23 represents an output from the demodulator 12, reference numeral 24 represents the synchronizing signal detection signal, reference numeral 26 represents an output from the D/A converter, reference numeral 27 represents a signal, e.g., a voice signal from the microphone 1, and reference numeral 28 represents an output from the D/A converter 4.

The controller 40 enables the operation of the transmission/reception switching unit 9. This unit 9 then outputs transmission/reception switching signals synchronously with synchronizing signal detection signals, to thereby switch the transceiver unit 13 between transmission and reception.

The compression/expansion controller 7 performs the following operations under the control of the controller 40. In these operations, the transceivers A and C perform the simultaneous transmission and reception using a single frequency.

(1) During the reception period, voice signals 23 labeled by A1, A2, . . . , A in FIG. 3 are input to the A/D converter 5, and their expanded signals 26 shown in FIG. 3 are output from the D/A converter 6. Therefore, signals such as voice signals from the transceiver A are output from the loudspeaker 14 as audible signals.

(2) During the transmission period, signals 27 such as voice signals shown in FIG. 3 input from the microphone 1 to the A/D converter 2 are compressed and output as signals 28 shown in FIG. 3 from the D/A converter 4. The controller 40 turns the switch 17 to the contact b so that the output of the D/A converter 4 is supplied to the modulator 11 and the transceiver unit 13 transmits the compressed signal.

In this manner, the simultaneous transmission and reception with a single frequency is performed synchronously with the synchronizing signal detection signal 24 received from the partner transceiver. When the detection of the synchronizing signal detection signal from the partner receiver is stopped, the controller 40 disables the operation of the transmission/reception switching unit 9. Thereafter, switching between transmission and reception follows the operation of the press-to-talk switch 15. In this case, the controller 40 turns the switch 18 to the contact a so that an output of the demodulator 12 is directly supplied to the loudspeaker 14. The controller 40 turns also the switch 17 to the contact a to allow a signal such as a voice signal from the microphone 1 to be directly supplied to the modulator 11. In this manner, the operation returns to the simplex communication mode.

Figure 4:
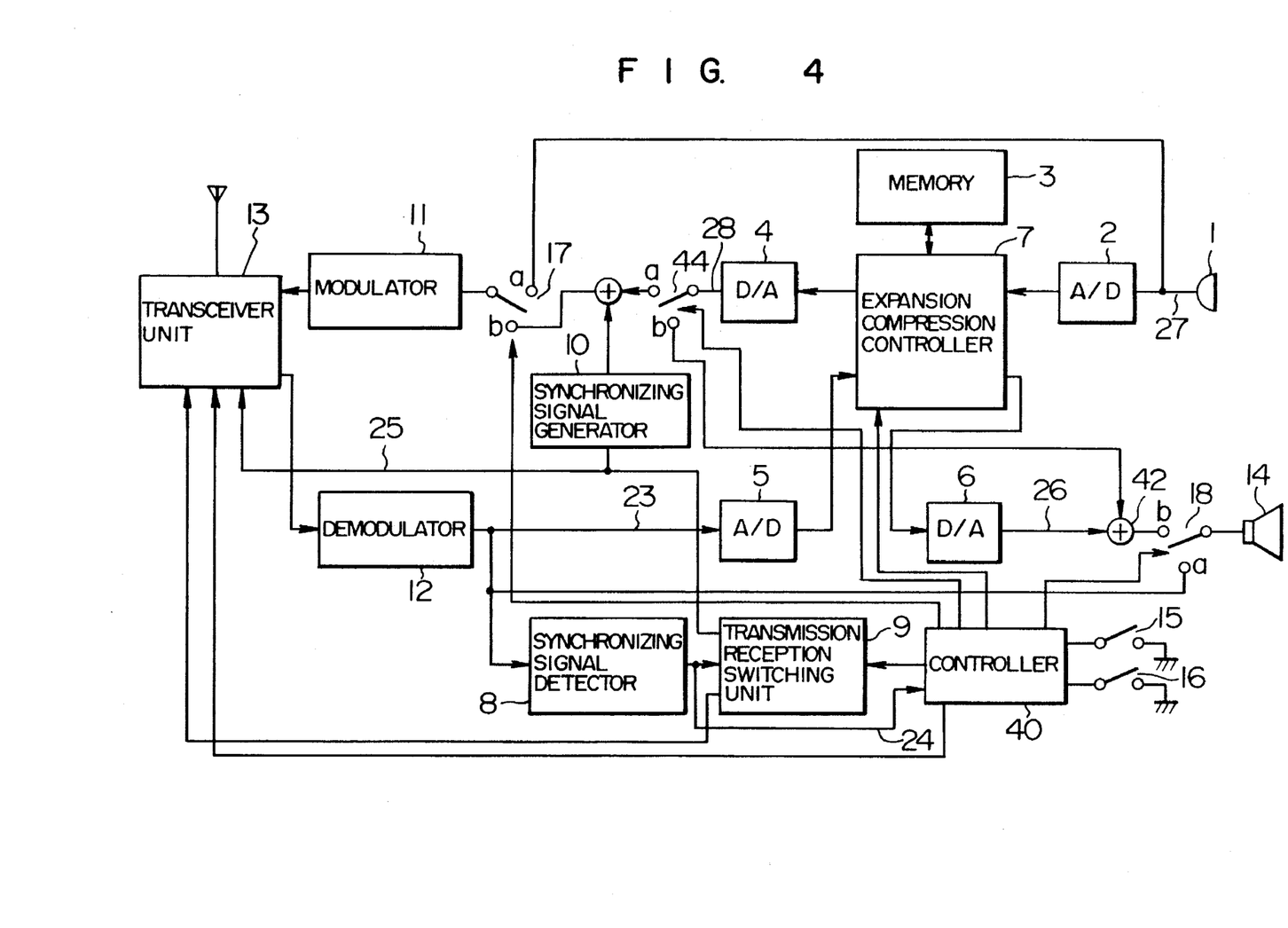
FIG. 4 is a circuit block diagram of a radio apparatus according to another embodiment of the present invention.

FIG. 4 shows another embodiment of the present invention. In the embodiment shown in FIG. 1, compressed signals transmitted from the transceivers A and B are stored in the memory. The compressed signals stored in the memory 3 are thereafter read and expanded under the control by the compression/expansion controller 7. The signals from the transceivers A and B are distributed to the D/A converters 6 and 41, respectively, to convert them into analog signals. Therefore, the embodiment shown in FIG. 1 requires expensive two D/A converters and a room for installing them. The embodiment shown in FIG. 4 solves these issues. Specifically, since the D/A converter 4 is not used when the transceiver C monitors the contents of communication between the transceivers A and B, this D/A converter may be used during the monitoring mode in this embodiment. To this end, a switch 44 is provided at the output side of the D/A converter 4. The controller 40 of this embodiment performs the following operations.

Referring to FIG. 4, in the monitoring mode, the switch 44 is turned to contact b. The transmission/reception switching signal 25 from the transmission/reception switching unit 9 takes the "L" level as indicated at (c) in FIG. 2. Signals received by the transceiver unit 13 and output from the A/D converter 5 are signals 23 indicated at (a) in FIG. 2. These signals 23 are stored via the compression/expansion controller 7 into memory 3. The stored signals are read and expanded under the control of the compression/expansion controller 7. In reading and expanding these signals, the controller 40 controls supply of the signals from the transceiver A to the D/A converter 6 which converts the signals into original signals such as voice signals indicated at (d) in FIG. 2. The converted original signals are applied to the adder 42. Signals from the transceiver B are applied to the D/A converter 4 which converts the signals into an original signal such as voice signals like those indicated at (e) in FIG. 2. The converted original signals are applied via the switch 44 to the adder 42. As a result, both signals from the transceivers A and B are supplied from the adder 42 to the loudspeaker 14. In this manner, without using an additional expensive D/A converter, the transceiver having the same functions as the embodiment shown in FIG. 1 can be realized. The other functions not described in this embodiment are similar to the embodiment shown in FIG. 1.

Figure 8:
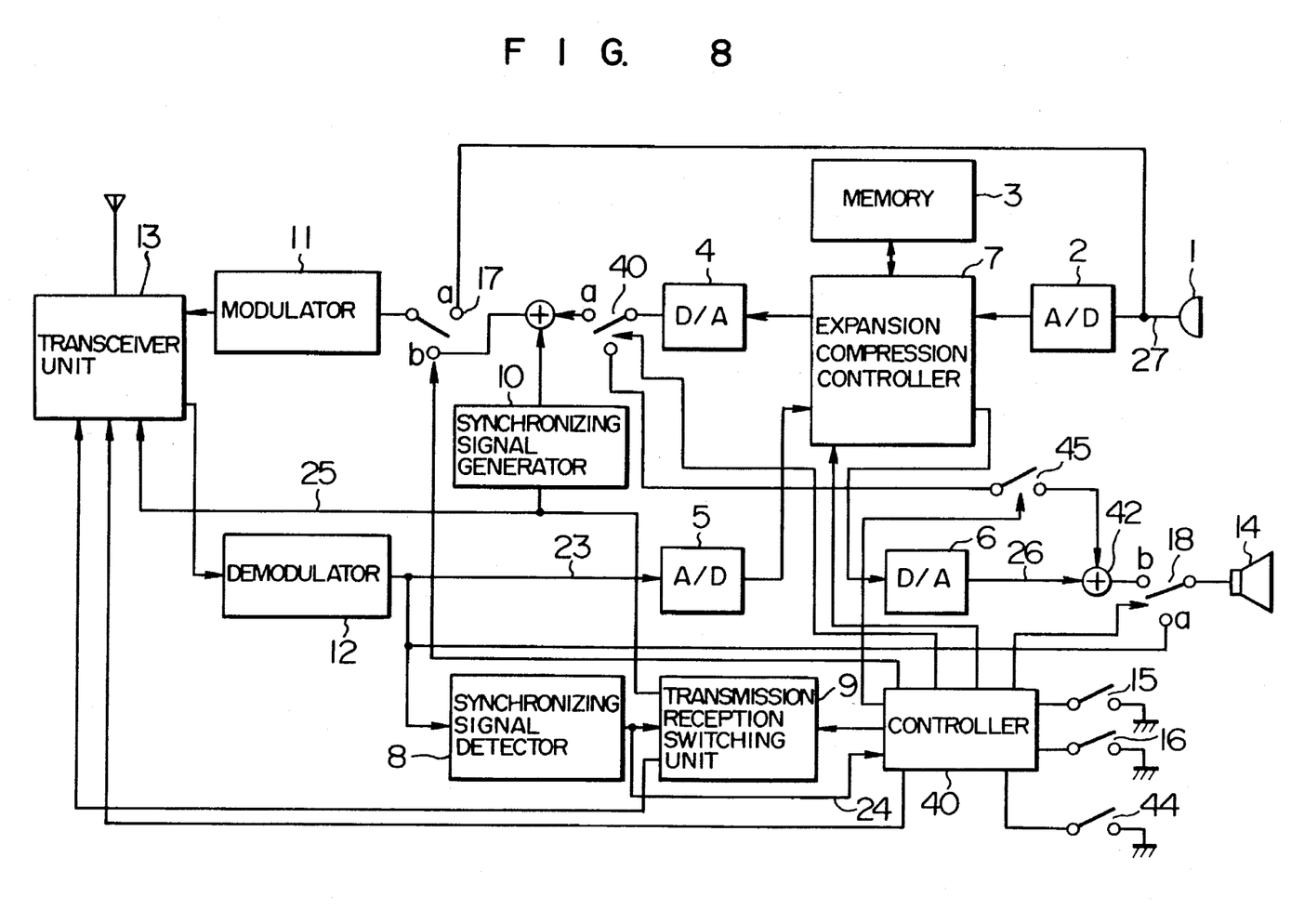
FIG. 8 is a circuit block diagram of a radio apparatus according to another embodiment of the present invention.

FIG. 8 shows another embodiment of the present invention in which a switch 45 and a switch 44 are provided, the switch 45 being inserted between the switch 40 and the adder 42, and the switch 44 designating whether the switch 45 is to be turned on or off in the monitoring mode.

If the switch 44 is depressed in the monitoring mode, the controller 40 turns on the switch 45. In this case, similar to the embodiment shown in FIG. 4, outputs from the D/A converters 4 and 6 are added by the adder 42 and original signals are reproduced by the loudspeaker 14.

If the switch 44 is not depressed in the monitoring mode, the controller 40 turns off the switch 45 so that an output from the D/A converter 4 is not supplied to the adder 42. In this case, only an output from the D/A converter 6 is reproduced by the loudspeaker 14.

With this embodiment, the transceiver C can receive both voices from the transceiver A which generates synchronizing signals and from the transceiver B which performs the simultaneous transmission and reception communication synchronously with received synchronizing signals, or only the voice from the transceiver A.

The radio apparatus of the embodiments has both the transmission and reception functions. If only the monitoring function is required, the radio apparatus may have only the reception function.

According to the present invention, in the communication area where two transceivers operate, the radio apparatus of the invention can receive both voices from one transceiver (originating call station) which generates synchronizing signals and from another transceiver (incoming call station) which performs the simultaneous transmission and reception communication synchronously with received synchronizing signals, or only the voice from the transceiver (originating call station). It is therefore possible to provide the simultaneous transmission and reception with a single frequency communication apparatus which is excellent in practical use.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A radio apparatus for substantially simultaneous transmission and reception using a single frequency, and having a synchronizing signal generator unit for informing a callee of a switch timing between transmission and reception, a synchronizing signal detector unit for detecting a synchronizing signal contained in a signal received from a caller, and a transmission/reception switching unit for switching between transmission and reception synchronously with one of said detected synchronizing signal transmitted from the caller and a timing generated by the callee, in which a transmission signal is stored in a memory via a first A/D converter at a predetermined time interval, the stored data is read by reading out the signal from the memory at substantially half the predetermined time interval and applied to a modulator via a first D/A converter during a transmission period to transmit said transmission signal compressed in time by substantially half, a reception signal from a first transceiver compressed in time by substantially half is stored via a second A/D converter at the predetermined time interval, the stored data is read out from the memory at substantially twice the predetermined time interval so as to expand to the original signal of the reception signal and applied to a second D/A converter, said radio apparatus comprising:

means for receiving a signal from a first transceiver;

means for receiving a signal from a second transceiver compressed in time by substantially half during said transmission period;

a controller unit for selecting either performing duplex communication synchronously with said detected synchronizing signal of said first transceiver during the period said synchronizing signal is being detected or receiving said signal from said second transceiver during said transmission period; and a third D/A converter and an adder, wherein if said signal from said second transceiver is to be received during said transmission period, said compressed signals from said first and second transceivers are stored in the memory via said second A/D converter, the stored data is read out from the memory at substantially twice the predetermined time interval, said read signal for said first transceiver is applied to said second D/A converter, said read signal for said second transceiver is applied to said third D/A converter, the outputs of said second and third D/A converters are applied to said adder, and the added signal is output from said adder as a reproduced signal from said first and second transceivers.

2. A radio apparatus according to claim 1, further comprising control means for providing said first D/A converter with the function of said third D/A converter, and controlling to apply an output of said first D/A converter to one of said modulator and said adder, wherein when a signal from said second transceiver is received, the signal from said second transceiver is stored via said second A/D converter, the stored data is read at substantially twice the predetermined time interval and applied via said first D/A converter to said adder.

3. A radio apparatus for substantially simultaneously transmitting and receiving signals using a single frequency, wherein a transmission period and a reception period in said radio apparatus are alternately set in operation, said radio apparatus comprising:

means for transmitting a first transmission signal to a first transceiver during said transmission period of said radio apparatus, said first transmission signal having been compressed in time axis by a predetermined rate;

means for receiving a second transmission signal from said first transceiver during said reception period of said radio apparatus, said second transmission signal having been compressed in time axis by the predetermined rate;

means for reproducing a first original signal from said second transmission signal;

means for receiving a third transmission signal from a second transceiver during the transmission period of said radio apparatus, said third transmission signal having been compressed in time axis by the predetermined rate;

means for reproducing a second original signal from said third transmission signal;

means for adding said first and second original signals, and outputting the added signal; and control means for controlling said transmitting means and said third signal receiving means, and selecting either operation of said transmitting means transmitting said first transmission signal and said third signal receiving means receiving said third transmission signal during said transmission period of said radio apparatus.

4. A radio apparatus according to claim 3, wherein said control means further include means for transmitting said first transmission signal directly via a modulator during said transmission period and outputting said second transmission signal from said first transceiver directly via a demodulator.

5. A radio apparatus according to claim 3, wherein said predetermined rate is one-half or more.

6. A radio apparatus according to claim 3, further comprising means for selecting one of said first, second and third signals.

7. A radio apparatus for substantially simultaneously transmitting and receiving signals with a single frequency, comprising:

a synchronizing signal detector unit for detecting a synchronizing signal contained in a first reception signal received from a first transceiver;

a synchronizing signal generator unit for generating a switch timing signal between transmission and reception periods, said switching timing signal being synchronized with said synchronizing signal from said first transceiver;

a first A/D converter for converting an analog signal into a digital signal;

memory means coupled to said first A/D converter, for storing said digital signal at a predetermined time interval, said predetermined time interval being synchronized with said synchronizing signal;

a first D/A converter for converting the digital signal read out from said memory means into an analog signal, said digital signal being read out from said memory means at substantially half said predetermined time interval so as to compress the digital signal supplied to said first D/A converter;

means for modulating the compressed analog signal from said first D/A converter, and transmitting the modulated signal as a transmission signal during said transmission period;

means for receiving and demodulating the first reception signal from said first transceiver during said reception period and for receiving and demodulatinq a second reception signal from a second transceiver during said transmission period, said first reception signal having been compressed in time axis by substantially half the predetermined time interval and said second reception signal having been compressed in time axis by substantially half the predetermined time interval;

a second A/D converter coupled to said memory means, for converting the demodulated first reception signal into a digital first reception signal and for converting the demodulated second reception signal into a digital second reception signal said digital first reception signal being stored in said memory means and said diqital second reception signal being stored in said memory means;

a second D/A converter coupled to said memory means, for converting the digital first reception signal from said memory means into an analog first reception signal, said digital first reception signal being read out from said memory means at substantially twice the predetermined time interval so as to expand said first digital reception signal in time axis to be an original signal which is supplied to said second D/A converter;

control means for selecting either performing duplex communication in synchronism with the detected synchronizing signal during the period when said synchronizing signal is being detected or receiving said second reception signal from said second transceiver during said transmission period;

a third D/A converter coupled to said memory means for converting said digital second reception signal stored in said memory means into a second analog reception signal; and an adder coupled to said second and third D/A converters, wherein when said second reception signal from said second transceiver is received during said transmission period, the compressed first and second reception signals are stored in said memory means through said second A/D converter, the stored reception signals are read out at substantially twice the predetermined time interval, the read out digital first reception signal is supplied to said second D/A converter, the read out digital second reception signal is supplied to said third D/A converter, and said adder adds said analog first reception signal from said second D/A converter with said analog second reception signal from said third D/A converter.

* * * * *